US012142205B2

(12) United States Patent
Kim et al.

(10) Patent No.: US 12,142,205 B2
(45) Date of Patent: Nov. 12, 2024

(54) POWER SUPPLY, LIGHT EMITTING DISPLAY DEVICE AND DRIVING METHOD THEREOF

(71) Applicant: LG Display Co., Ltd., Seoul (KR)

(72) Inventors: Jung Jae Kim, Paju-si (KR); Dong Won Park, Paju-si (KR); Yong Chul Kwon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/977,558

(22) Filed: Oct. 31, 2022

(65) Prior Publication Data

US 2023/0215351 A1 Jul. 6, 2023

(30) Foreign Application Priority Data

Dec. 30, 2021 (KR) ........................ 10-2021-0192845

(51) Int. Cl.
*G09G 3/3225* (2016.01)

(52) U.S. Cl.
CPC ... *G09G 3/3225* (2013.01); *G09G 2300/0842* (2013.01); *G09G 2310/0291* (2013.01); *G09G 2310/061* (2013.01); *G09G 2320/0233* (2013.01); *G09G 2330/00* (2013.01)

(58) Field of Classification Search
CPC ......... G09G 3/3225; G09G 2300/0842; G09G 2310/0291; G09G 2310/061; G09G 2320/0233; G09G 2330/00; G09G 3/32; G09G 3/3233; G09G 3/36; G09G 3/3648
See application file for complete search history.

(56) References Cited

U.S. PATENT DOCUMENTS

| | | | | |
|---|---|---|---|---|
| 2004/0252089 A1* | 12/2004 | Ono | G09G 3/3233 | 345/82 |
| 2014/0327475 A1* | 11/2014 | Groot | H03K 17/22 | 327/143 |
| 2021/0272505 A1* | 9/2021 | Kim | G09G 3/36 | |
| 2022/0335881 A1* | 10/2022 | Kim | G09G 3/32 | |

* cited by examiner

*Primary Examiner* — Michael A Faragalla
(74) *Attorney, Agent, or Firm* — Birch, Stewart, Kolasch & Birch, LLP

(57) ABSTRACT

A light emitting display device can include a display panel configured to display an image, a driver configured to drive the display panel, and a power supply configured to supply a high-level voltage to a first power line of the display panel. Also, the power supply includes a voltage controller configured to receive, from the driver, a vertical synchronization signal and current amount information of the high-level voltage for driving of the display panel, and boost the high-level voltage to be supplied to the display panel during a vertical blank period, based on the vertical synchronization signal and the current amount information of the high-level voltage.

14 Claims, 17 Drawing Sheets

POWER SUPPLY, LIGHT EMITTING DISPLAY DEVICE AND DRIVING METHOD THEREOF

CROSS-REFERENCE TO RELATED APPLICATION

This application claims priority to Korean Patent Application No. 10-2021-0192845 filed in the Republic of Korea on Dec. 30, 2021, the entirety of which is hereby incorporated by reference as if fully set forth herein.

BACKGROUND

Field of the Invention

The present disclosure relates to a power supply, a light emitting display device and a driving method thereof.

Discussion of the Related Art

In accordance with development of information technology, the market for display devices as a medium for interconnecting users and information is expanding. As such, use of display devices, such as a light emitting display (LED) device, a quantum dot display (QDD) device, a liquid crystal display (LCD) device and the like, is increasing.

The above-mentioned display devices include a display panel including subpixels, a driver configured to output a drive signal for driving the display panel, and a power supply configured to generate electric power to be supplied to the display panel or the driver.

When drive signals, for example, scan signals and data signals, are supplied to subpixels formed at a display panel in a display device as mentioned above, selected ones of the subpixels transmit light or directly emit light and, as such, the display device can display an image.

Display devices can be unduly influenced by voltage drops, which can impair image quality. For example, a high-level voltage supplied to a display panel may be influenced by a voltage drop caused by IR drop and, as such, there may be a voltage difference among different areas of the display panel, which can be especially pronounced in large, high resolution display panels. The voltage drop caused by the IR drop may gradually increase in areas that are located farther away from an area where the high-level voltage is directly supplied to the display panel from the power supply. For instance, when the high-level voltage is supplied, from the power supply, to the lower end area of the display panel, a highest voltage drop may occur in the upper end area of the display panel, and a lowest voltage drop may occur in the lower end area of the display panel (e.g., and vice-versa, when the high-level voltage is directly supplied to the upper end area of the display panel). When different areas of the display panel have different levels for the high-level voltage, then image quality can be impaired.

SUMMARY OF THE DISCLOSURE

Accordingly, the present disclosure is directed to a power supply, a light emitting display device and a driving method thereof that substantially obviate one or more problems due to limitations and disadvantages of the related art.

An object of the present disclosure is to not only eliminate influence of IR drop or voltage drop, but also to stably supply current for driving of a display panel, based on a power supply capable of performing constant voltage driving and constant current driving, corresponding to a driving period of the display panel, thereby maintaining a uniform display quality throughout a screen.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a light emitting display device includes a display panel configured to display an image, a driver configured to drive the display panel, and a power supply configured to supply a high-level voltage to a first power line of the display panel, in which the power supply includes a voltage controller configured to receive, from the driver, a vertical synchronization signal and current amount information of a high-level voltage for driving of the display panel, and to boost a high-level voltage to be supplied to the display panel during a vertical blank period, based on the vertical synchronization signal and the current amount information of the high-level voltage.

The voltage controller can receive a voltage fed back from the first power line while sensing current from the first power line, can set output current of a high-level voltage based on the current amount information and the sensed current, and can internally store the fed-back voltage, for use of the stored voltage as a reference value for boosting of the high-level voltage to be supplied to the display panel.

The voltage controller can include an error amplifier configured to output a voltage control signal for control of the high-level voltage, an output current sensing circuit configured to supply sensing results of the current from the first power line to a first inverting terminal of the error amplifier, a first control transistor configured to supply a reference voltage to a non-inverting terminal of the error amplifier, in response to the vertical synchronization signal, a second control transistor configured to supply a compensation voltage stored in a compensation capacitor to the non-inverting terminal of the error amplifier, in response to an inverted vertical synchronization signal generated through inversion of the vertical synchronization signal, and a third control transistor configured to store a high-level voltage fed back from the first power line in the compensation capacitor, in response to an inverted and delayed vertical synchronization signal generated through delay of the inverted vertical synchronization signal.

The power supply can perform constant-current driving when the display panel is driven, and can perform constant-voltage driving when the display panel is not driven.

The power supply can turn off the first and third control transistors and can turn on the second control transistor, for boosting of the high-level voltage to be supplied to the display panel, during a period in which the constant-voltage driving is performed.

The power supply can include a first constant-current driving period in which the power supply turns on the first and third control transistors and turns off the second control transistor, for storage of the high-level voltage fed back from the first power line in the compensation capacitor, during a period in which the constant-current driving is performed.

The power supply can include a second constant-current driving period in which the power supply turns off the second and third control transistors and turns on the first control transistor after completion of the first constant-current driving period, for satisfaction of set current during the period in which the constant-current driving is performed.

In another aspect of the present disclosure, there is provided a method for driving a light emitting display device, the method including constant-voltage driving step of boosting a high-level voltage to be supplied to a display panel during a vertical blank period based on a vertical synchronization signal supplied from a driver and a current amount information of the high-level voltage for driving of the display panel, and constant-current driving step of driving the display panel by constant current during a period in which the vertical synchronization signal is applied to the display panel.

The constant-current driving step can include a first constant-current driving period in which a high-level voltage fed back from a first power line of the display panel is stored in a compensation capacitor of a power supply, and a second constant-current driving period in which the display panel is constantly driven under a predetermined current condition of the power supply.

In the constant-voltage driving step, the fed-back high-level voltage stored in the compensation capacitor can be used as a reference value for boosting of the high-level voltage to be supplied to the display panel.

In another aspect of the present disclosure, there is provided a power supply including a vertical synchronization signal input circuit configured to receive a vertical synchronization signal from an external device, a voltage controller configured to receive current amount information of a high-level voltage from the external device, and to output a voltage control signal during a vertical blank period, based on the vertical synchronization signal and the current amount information of the high-level voltage, and a voltage output circuit configured to vary the high-level voltage during the vertical blank period, based on the voltage control signal, and to output the varied high-level voltage.

The voltage controller can include an error amplifier configured to output a voltage control signal, an output current sensing circuit configured to supply current sensing results output from the voltage output circuit to a first inverting terminal of the error amplifier, a first control transistor configured to supply a reference voltage to a non-inverting terminal of the error amplifier, in response to the vertical synchronization signal, a second control transistor configured to supply a compensation voltage stored in a compensation capacitor to the non-inverting terminal of the error amplifier, in response to an inverted vertical synchronization signal generated through inversion of the vertical synchronization signal, and a third control transistor configured to store an externally fed-back high-level voltage in the compensation capacitor, in response to an inverted and delayed vertical synchronization signal generated through delay of the inverted vertical synchronization signal.

The high-level voltage can be boosted when the first and third control transistors are turned off, and the second control transistor is turned on.

The compensation capacitor can store the externally fed-back high-level voltage when the first and third control transistors are turned off, and the second control transistor is turned on.

The voltage controller can boost the high-level voltage, based on the fed-back high-level voltage stored in the compensation capacitor.

In accordance with the example embodiments of the present disclosure, there are effects of not only eliminating influence of IR drop, but also stably supplying current for driving of a display panel, based on a power supply capable of performing constant voltage driving and constant current driving, corresponding to a driving period of the display panel, thereby maintaining a uniform display quality throughout a screen. In addition, in accordance with the example embodiments of the present disclosure, there is an effect of providing a power supply capable of adaptively controlling a voltage and current, corresponding to a driving period of the display panel.

BRIEF DESCRIPTION OF THE DRAWINGS

The accompanying drawings, which are included to provide a further understanding of the disclosure and are incorporated in and constitute a part of this application, illustrate embodiment(s) of the disclosure and along with the description serve to explain the principle of the disclosure. In the drawings.

DETAILED DESCRIPTION OF THE EMBODIMENTS

Figure 1:
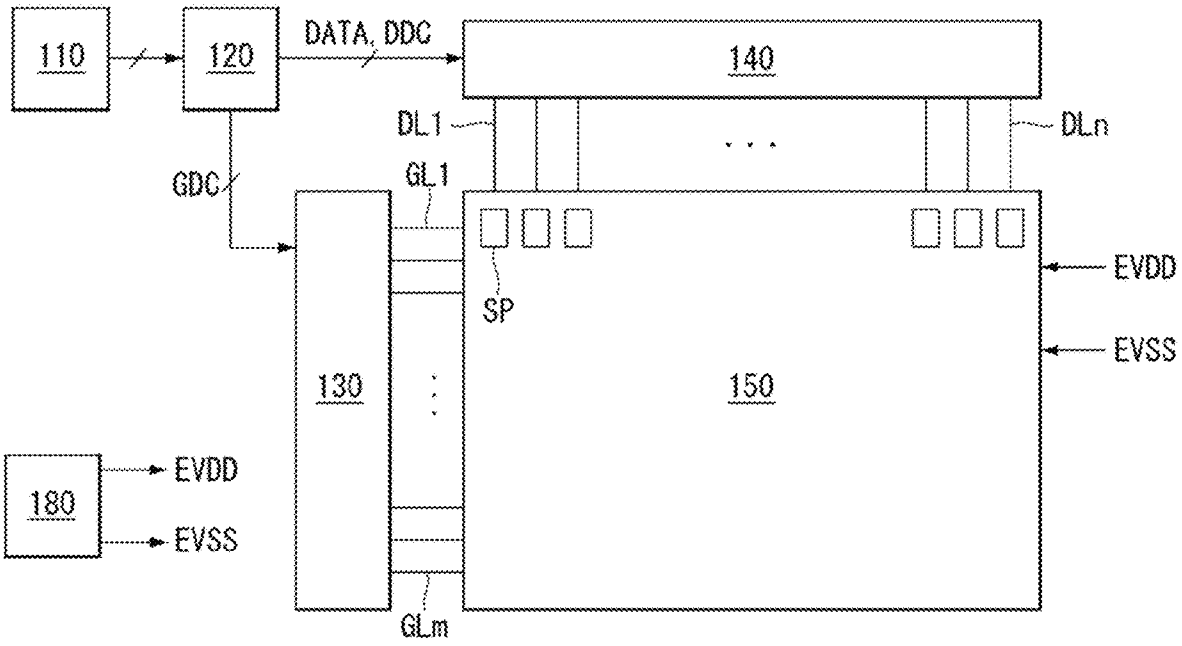
FIG. 1 is a block diagram schematically showing a light emitting display device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience. Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

A display device according to an example embodiment of the present disclosure can be implemented as a television, an image player, a personal computer (PC), a home theater, an automobile electric device, a smartphone, etc., without being limited thereto. The display device according to example embodiments of the present disclosure can be implemented as a light emitting display (LED) device, a quantum dot display (QDD) device, a liquid crystal display (LCD) device, etc. However, the following description will be given in conjunction with, for example, a light emitting display device configured to directly emit light based on an inorganic light emitting diode or an organic light emitting diode, for convenience of description. Further, all components of each display device according to all embodiments of the present disclosure are operatively coupled and configured. Also, the 'disclosure' and 'disclosure' are interchangeably used herein.

Figure 2:
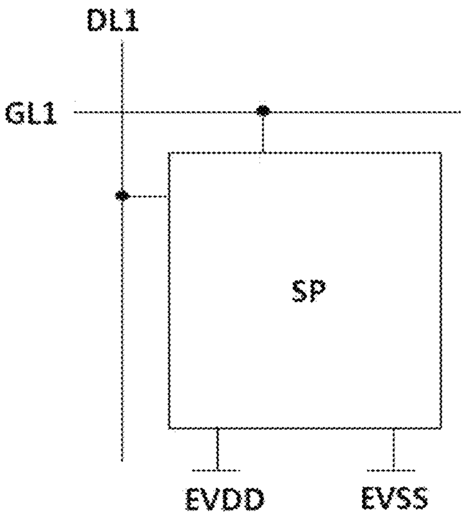
FIG. 2 is a diagram schematically showing a subpixel shown in FIG. 1 according to an embodiment of the present disclosure.

FIG. 1 is a block diagram schematically showing a light emitting display device. FIG. 2 is a diagram schematically showing a subpixel shown in FIG. 1.

As shown in FIGS. 1 and 2, the light emitting display device can include an image supplier 110 (e.g., a host system), a timing controller 120, a scan driver 130 (e.g., gate driver), a data driver 140, a display panel 150, a power supply 180, etc.

The image supplier 110 (e.g., a set or a host system) can output various driving signals together with an image data signal supplied from an exterior thereof or an image data signal stored in an inner memory thereof. The image supplier 110 can supply a data signal and various driving signals to the timing controller 120.

The timing controller 120 can output a gate timing control signal GDC for control of an operation timing of the scan driver 130, a data timing control signal DDC for control of an operation timing of the data driver 140, various synchronization signals (e.g., a vertical synchronization signal Vsync and a horizontal synchronization signal Hsync, etc.). The timing controller 120 can supply, to the data driver 140, a data signal DATA supplied from the image supplier 110 together with the data timing control signal DDC. The timing controller 120 can take the form of an integrated circuit (IC) and, as such, can be mounted on a printed circuit board, without being limited thereto.

The scan driver 130 can output a scan signal (or a scan voltage) in response to the gate timing control signal GDC supplied from the timing controller 120. The scan driver 130 can supply a scan signal to the subpixels included in the display panel 150 through gate lines GL1 to GLm where m can be a positive integer. The scan driver 130 can take the form of an IC or can be directly formed on the display panel 150 in a gate-in-panel manner, without being limited thereto.

The data driver 140 can sample and latch a data signal DATA in response to the data timing control signal DDC supplied from the timing controller 120, can convert the resultant data signal, which has a digital form, into a data voltage having an analog form, based on a gamma reference voltage, and can output the data voltage. The data driver 140 can supply the data voltage to the subpixels included in the display panel 150 through data lines DL1 to DLn where n can be a positive integer. The data driver 140 can take the form of an integrated circuit (IC) and, as such, can be mounted on the display panel 150 or can be mounted on a printed circuit board, without being limited thereto.

The power supply 180 can generate a high-level voltage and a low-level voltage based on an external input voltage supplied from an exterior thereof. The power supply 180 can output the high-level voltage through a first power line EVDD and the low-level voltage through a second power line EVSS. The power supply 180 can generate and output not only the high-level voltage and the low-level voltage, but also a voltage (e.g., a gate voltage including a gate-high voltage and a gate-low voltage) for driving of the scan driver 130, a voltage (e.g., a drain voltage and a drain voltage including a half drain voltage) for driving of the data driver 140, etc.

The display panel 150 can display an image, corresponding to the driving signal including the scan signal and the data voltage, a driving voltage including the high-level voltage and the low-level voltage, etc. The subpixels of the display panel 150 can directly emit light. The display panel 150 can be fabricated based on a substrate having stiffness or ductility, such as glass, silicon, polyimide or the like. The subpixels, which emit light, can be constituted by red, green and blue subpixels or red, green, blue and white subpixels.

For example, one subpixel SP can include a pixel circuit connected to a first data line DL1, a first gate line GL1, a first power line EVDD and a second power line EVSS while including a switching transistor, a driving transistor, a capacitor, an organic light emitting diode, etc. The subpixel SP, which is used in the light emitting display device, has a complex circuit configuration because the subpixel SP directly emits light. Furthermore, a compensation circuit configured to compensate for degradation of not only the organic light emitting diode, which emits light, but also the driving transistor configured to supply, to the organic light emitting diode, driving current for driving of the organic light emitting diode, etc. is also diverse and can be varied. For convenience of illustration, however, the subpixel SP is simply shown in the form of a block.

Meanwhile, in the above description, the timing controller 120, the scan driver 130, the data driver 140, etc. have been described as having individual configurations, respectively. However, one or more of the timing controller 120, the scan driver 130 and the data driver 140 can be integrated into one IC in accordance with an implementation type of the light emitting display device.

Figure 3:
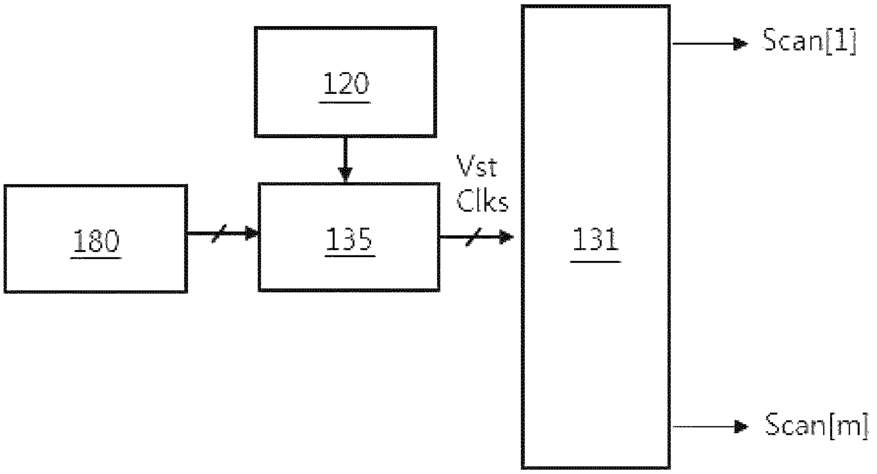
FIGS. 3 and 4 are views explaining a configuration of a gate-in-panel type scan driver according to embodiments of the present disclosure.
Figure 4:
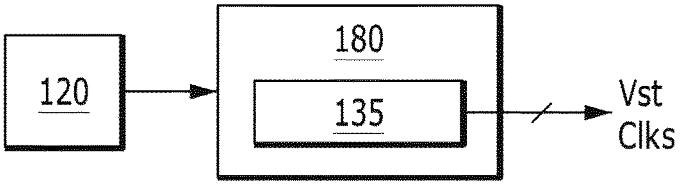
Figure 5A:
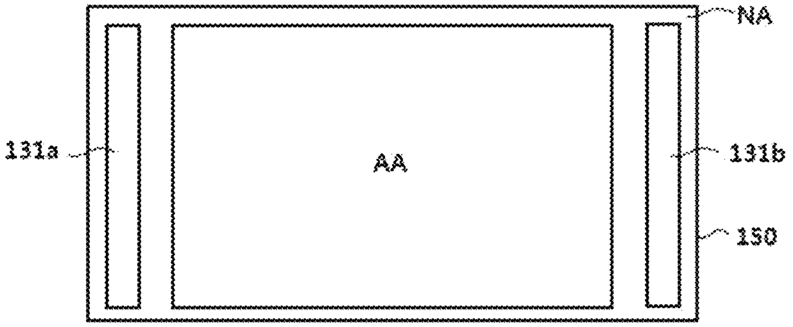
FIGS. 5A and 5B are views showing disposition examples of the gate-in-panel type scan driver according to embodiments of the present disclosure.
Figure 5B:
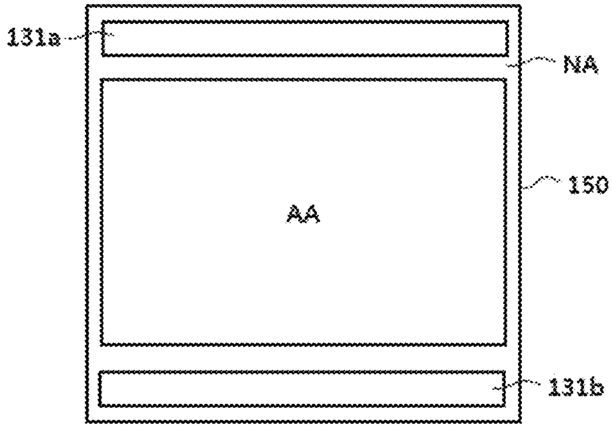
Figure 6:
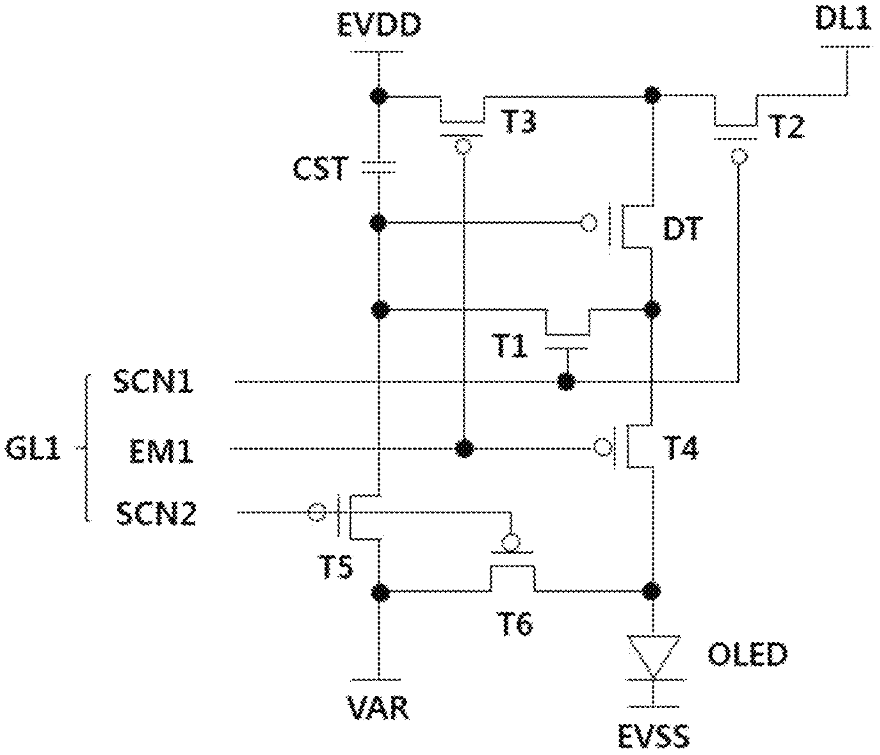
FIG. 6 is a diagram illustrating a configuration of a subpixel applicable to an embodiment of the present disclosure.

FIGS. 3 and 4 are views explaining a configuration of a gate-in-panel type scan driver. FIGS. 5A and 5B are views showing disposition examples of the gate-in-panel type scan driver. FIG. 6 is a diagram illustrating a configuration of a subpixel applicable to an example embodiment of the present disclosure.

As shown in FIG. 3, the gate-in-panel type scan driver, which is designated by reference numeral "130," can include a shift register 131 and a level shifter 135. The level shifter 135 can generate driving clock signals Clks, a start signal Vst, etc. based on signals and voltages output from a timing controller 120 and a power supply 180. The driving clock signals Clks can be generated under the condition that the driving clock signals Clks have J different phases (J being an integer of 2 or greater), such as 2-phase, 4-phase, 8-phase, etc.

The shift register 131 can operate based on the signals Clks and Vst, etc. output from the level shifter 135, and can output scan signals Scan[1] to Scan[m] capable of turning on or off transistors formed at a display panel. The shift register 131 can be formed on the display panel in a gate-in-panel manner in the form of a thin film.

As shown in FIGS. 3 and 4, the level shifter 135 can be independently formed in the form of an IC or can be internally included in the power supply 180, differently from the shift register 131. However, this configuration is only illustrative, and the example embodiments of the present disclosure are not limited thereto.

As shown in FIGS. 5A and 5B, in a gate-in-panel type scan driver, shift registers 131*a* and 131*b*, which output scan signals, can be disposed in a non-display area NA of a display panel 150. The shift registers 131*a* and 131*b* can be disposed in left and right non-display areas NA of the display panel 150, as shown in FIG. 5A, or can be disposed in upper and lower non-display areas NA of the display panel 150, as shown in FIG. 5B. Meanwhile, although the shift registers 131*a* and 131*b* have been shown and described in FIGS. 5A and 5B as being disposed in the non-display area NA, the example embodiments of the present disclosure are not limited thereto.

As shown in FIG. 6, the subpixel, which is applicable to the example embodiment of the present disclosure, can include a first transistor T1, a second transistor T2, a third transistor T3, a fourth transistor T4, a fifth transistor T5, a sixth transistor T6, a capacitor CST, a driving transistor DT, and an organic light emitting diode OLED.

The subpixel applicable to the example embodiment of the present disclosure can be connected to a first gate line GL1 including a first scan line SCN1, a second scan line SCN2 and a first emission control line EM1. In this situation, as the second scan line SCN2, a scan line not included in the subpixel shown in FIG. 6, but included in a subpixel disposed at an upstream or downstream end of the subpixel shown in FIG. 6, can be used.

The first and second transistors T1 and T2 can be turned on in response to a first scan signal transmitted thereto through the first scan line SCN1. The fifth and sixth transistors T5 and T6 can be turned on in response to a second scan signal transmitted thereto through the second scan line SCN2. The third and fourth transistors T3 and T4 can be turned on in response to a first emission control signal transmitted thereto through the first emission control line EM1.

The first scan signal can be applied in a sampling period in which threshold voltage sampling of the driving transistor DT is carried out and a writing period in which a data voltage of a first data line DL1 is transmitted to a first node of the driving transistor DT. The second scan signal can be applied in an initialization period in which a voltage of a voltage line VAR is transmitted to a connection node between a gate electrode of the driving transistor DT and the capacitor CST and an anode of the organic light emitting diode OLED. The first emission control signal can be applied in an emission period in which a high-level voltage of a first power line EVDD is transmitted to a node of the driving transistor DT, and driving current generated from the driving transistor DT is transmitted to the anode of the organic light emitting diode OLED.

Of course, the subpixel described with reference to FIG. 6 is only illustrative, and the example embodiments of the present disclosure are applicable to almost any type of structure on a display panel, so long as the structure can be influenced by IR drop or a voltage drop. In addition, although a timing controller and a data driver are described as being implemented as one integrated driver, for convenience of description, the timing controller and the data driver can be distinguished from each other, as described with reference to FIG. 1.

Figure 7:
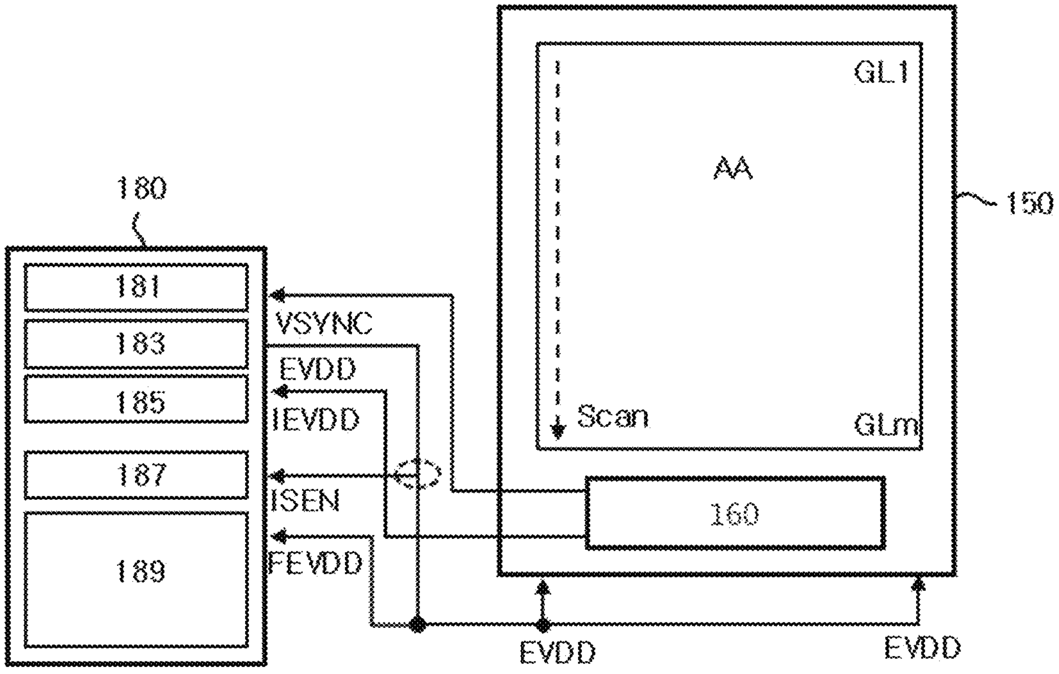
FIG. 7 is a diagram briefly explaining a power supply of a light emitting display device according to an embodiment of the present disclosure.
Figure 8:
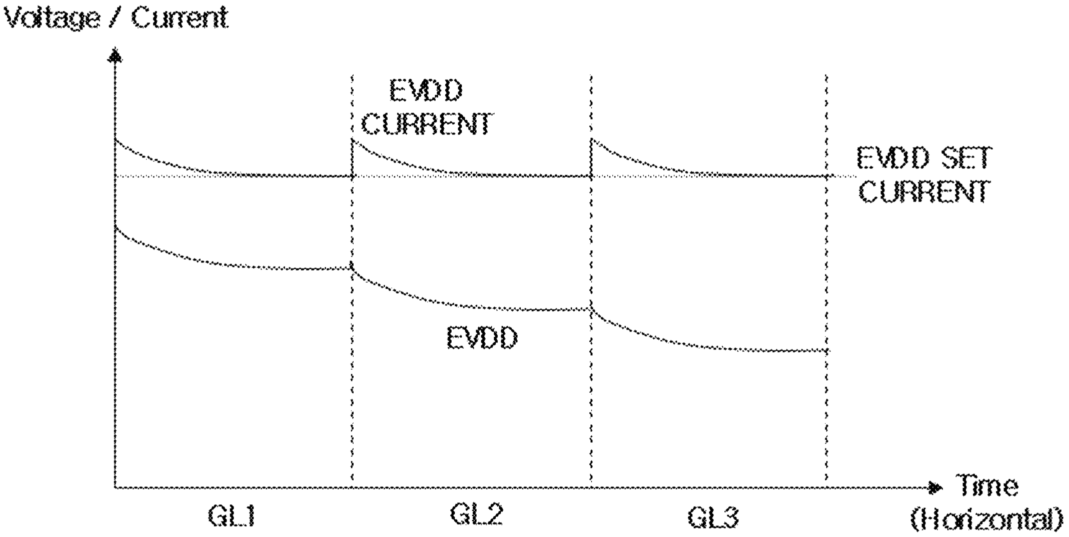
FIG. 8 is a diagram depicting an output voltage and output current output from the power supply shown in FIG. 7 according to an embodiment of the present disclosure.

FIG. 7 is a diagram briefly explaining a power supply of a light emitting display device according to a first embodiment of the present disclosure. FIG. 8 is a diagram depicting an output voltage and output current output from the power supply shown in FIG. 7.

As shown in FIG. 7, the light emitting display device can include a constant current control type power supply 180. The power supply 180 can rapidly raise (boost) a high-level voltage for driving of a display panel 150 during (or immediately after) a vertical blank period, based on a vertical synchronization signal VSYNC transmitted from a driver 160 and current amount information IEVDD by the display panel 150, thereby minimizing a problem caused by IR drop. For example, the power supply 180 can compensate for voltage drop characteristics of the display panel 150.

The power supply 180 can include a vertical synchronization signal input unit (circuit) 181, a voltage output unit (circuit) 183, an output current setting unit (circuit) 185, an output current sensing unit (circuit) 187, a current/voltage control unit (circuit) 189, etc.

The vertical synchronization signal input unit 181 can function to generate a circuit control signal capable of controlling the current/voltage control unit 189, based on the vertical synchronization signal VSYNC output from the driver 160.

The voltage output unit 183 can function to output a high-level voltage and to vary the high-level voltage based on a voltage control signal output from the current/voltage control unit 189.

The output current setting unit 185 can function to set output current of the high-level voltage output from the power supply 180, based on current amount information IEVDD of the high-level voltage transmitted from the driver 160, and transmit an output current setting value to the output current sensing unit 187. For reference, the current amount information IEVDD of the high-level voltage for driving of the display panel 150 can be calculated based on analysis of a data signal by the driver 160 (e.g., in the situation in which a timing controller and a data driver are distinguished from each other, the current amount information of the high-level voltage can be calculated by the timing controller).

The output current sensing unit 187 can function to sense output current ISEN of a high-level voltage from a first power line and output a sensing result value according to whether or not the sensed output current ISEN of the high-level voltage satisfies (approximates to) the output current setting value transmitted from the output current setting unit 185.

The current/voltage control unit 189 can function to generate a voltage control signal based on the vertical synchronization signal VSYNC transmitted from the vertical synchronization signal input unit 181, the sensing result value transmitted from the output current sensing unit 187, and a high-level voltage FEVDD fed back from the first power line. The voltage output unit 183 can control a high-level voltage based on the voltage control signal transmitted from the current/voltage control unit 189.

Meanwhile, although the vertical synchronization signal input unit 181, the voltage output unit 183, the output current setting unit 185, the output current sensing unit 187, and the current/voltage control unit 189 have been described in a distinguished manner, respectively, these units can be collectively referred to as one voltage controller.

As shown in FIGS. 7 and 8, the power supply 180 can output current of a high-level voltage EVDD CURRENT satisfying (approximating to) set current EVDD SET CURRENT. In addition, the power supply 180 can supply a high-level voltage EVDD that gradually varies from an upper end area of the display panel 150 farthest from a point where the high-level voltage EVDD is supplied to a lower end area of the display panel 150 nearest to the point where the high-level voltage EVDD is supplied.

The power supply 180 can supply a highest high-level voltage EVDD to the upper end area of the display panel 150, and can supply a lowest high-level voltage EVDD to the lower end area of the display panel 150. The reason why the high-level voltage EVDD is supplied in the above-described manner will be described hereinafter.

A scan operation Scan of the display panel 150 can sequentially start from a first gate line GL1 in the upper end area of the display panel 150 opposite to the lower end area of the display panel 150 where the driver 160 is disposed, and can then ended at an M-th gate line GLm at the lower end area of the display panel 150. The display panel 150 can receive the high-level voltage EVDD through the lower end area thereof where the driver 160 is disposed.

The high-level voltage EVDD supplied to the display panel 150 may be influenced by a voltage drop caused by IR drop and, as such, there may be a voltage difference among different areas of the display panel 150 (e.g., especially in large, high resolution display panels). The voltage drop caused by the IR drop may gradually increase in areas that are located farther away from an area where the high-level voltage EVDD is supplied. For instance, when the high-level voltage is supplied to the lower end area of the display panel 150, a highest voltage drop may occur in the upper end area of the display panel, and a lowest voltage drop may occur in the lower end area of the display panel 150.

Accordingly, in order to minimize a voltage drop problem caused by IR drop, the power supply 180 can control the high-level voltage EVDD based on the high-level voltage FEVDD fed back from the first power line, the output current ISEN sensed from the first power line, the vertical synchronization signal VSYNC transmitted from the driver 160 and the current amount information IEVDD of the high-level voltage transmitted from the driver 160.

Figure 9:
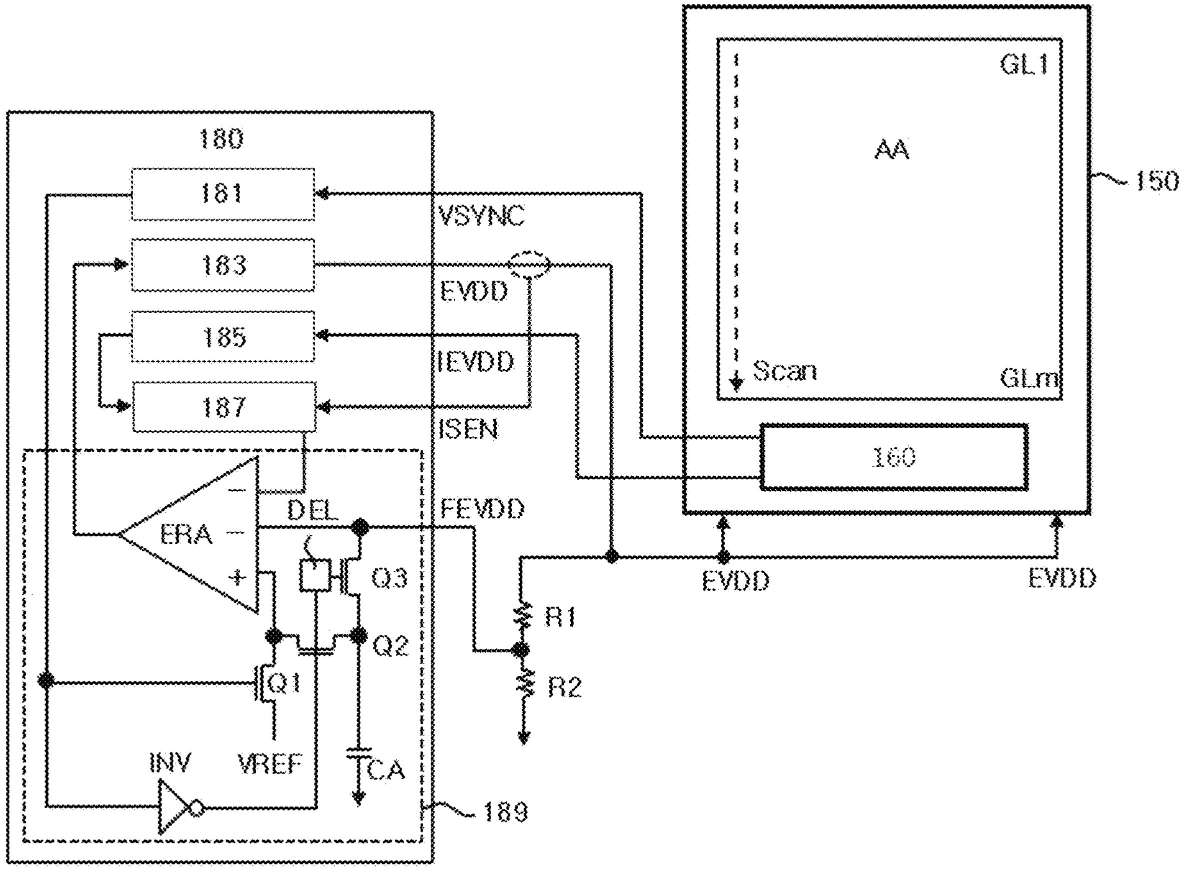
FIG. 9 is a diagram explaining a power supply according to another embodiment of the present disclosure in more detail.
Figure 10:
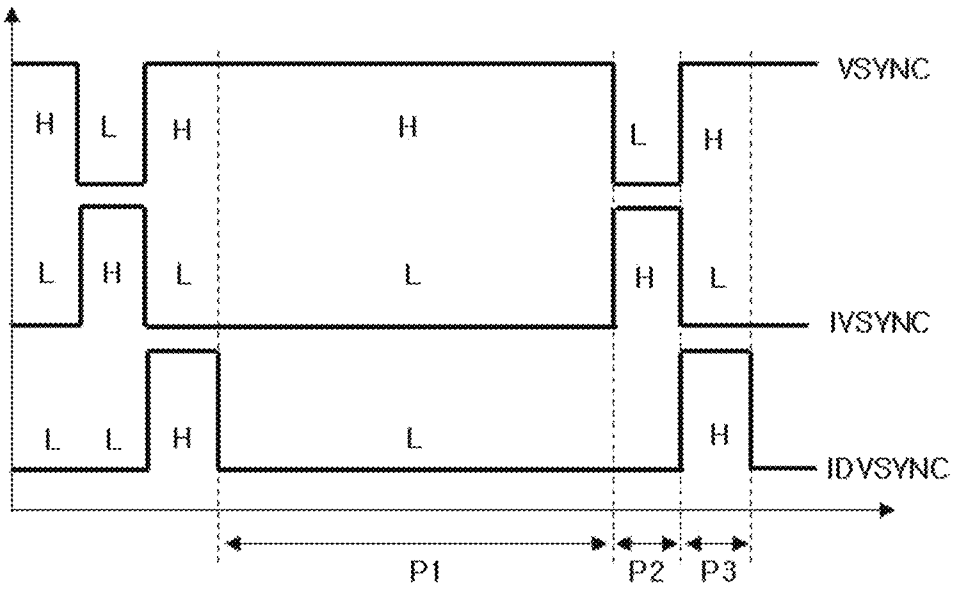
FIG. 10 is a diagram showing signals for driving of the power supply shown in FIG. 9 according to an embodiment of the present disclosure.

FIG. 9 is a diagram explaining a power supply according to a second embodiment of the present disclosure in more detail. FIG. 10 is a diagram showing signals for driving of the power supply shown in FIG. 9.

As shown in FIGS. 9 and 10, a current/voltage control unit 189 included in a power supply 180 can include an error amplifier ERA, a first control transistor Q1, a second control transistor Q2, a third control transistor Q3, an inverter INV, a compensation capacitor CA, a delay DEL, a first resistor R1, a second resistor R2, etc.

The error amplifier ERA can include an output terminal connected to an input terminal of a voltage output unit 183, a first inverting terminal (−) connected to an output terminal of an output current sensing unit 187, a second inverting terminal (−) connected to a high-level voltage feedback terminal, and a non-inverting terminal (+) connected to a first electrode of the first control transistor Q1. The error amplifier ERA can generate a voltage control signal for control of the voltage output unit 183 by comparing a greater one of a first input value input to the first inverting terminal (−) and a second input value input to the second inverting terminal (−) with a reference voltage transmitted through the first control transistor Q1.

The first control transistor Q1 can include a gate electrode connected to an output terminal of a vertical synchronization signal input unit 181, the first electrode connected to the non-inverting terminal (+) of the error amplifier ERA, and a second electrode connected to a reference voltage line VREF. The first control transistor Q1 can transmit a reference voltage of the reference voltage line VREF to the non-inverting terminal (+) of the error amplifier ERA, corresponding to a vertical synchronization signal VSYNC output through the output terminal of the vertical synchronization signal input unit 181. The first control transistor Q1 can be turned on, in response to a vertical synchronization signal VSYNC of logic high (H), during a first operation period P1 and a third operation period P3, and can be turned off, in response to a vertical synchronization signal VSYNC of logic low (L), during a second operation period P2.

A period in which the vertical synchronization signal VSYNC of logic high (H) is applied can be included in a driving period for image display of a display panel, and a period in which the vertical synchronization signal VSYNC of logic low (L) is applied (corresponding to a vertical blank period) can be included in a non-driving period for image non-display of the display panel.

The inverter INV can include an input terminal connected to an output terminal of the vertical synchronization signal input unit 181, and an output terminal connected to a gate electrode of the second control transistor Q2 and an input terminal of the delay DEL. The inverter INV can invert the vertical synchronization signal VSYNC and, as such, can output an inverted vertical synchronization signal IVSYNC.

The second control transistor Q2 can include the gate electrode connected to the output terminal of the inverter INV, a first electrode connected to the non-inverting terminal (+) of the error amplifier ERA, and a second electrode connected to one end of the compensation capacitor CA. The second control transistor Q2 can transmit a compensation voltage stored in the compensation capacitor CA to the non-inverting terminal (+) of the error amplifier ERA, corresponding to the inverted vertical synchronization signal IVSYNC output from the inverter INV. The second control transistor Q2 can be turned off, in response to an inverted vertical synchronization signal IVSYNC of logic low (L), during the first operation period P1 and the third operation period P3, and can be turned on, in response to an inverted vertical synchronization signal IVSYNC of logic high (H), during the second operation period P2.

The delay DEL can include the input terminal connected to the output terminal of the inverter INV, and an output terminal connected to a gate electrode of the third control transistor Q3. The delay DEL can transmit an inverted and delayed vertical synchronization signal IDVSYNC to the gate electrode of the third control transistor Q3.

The third control transistor Q3 can include the gate electrode connected to the output terminal of the delay DEL, a first electrode connected to the second inverting terminal (–) of the error amplifier ERA, and a second electrode connected to the one end of the compensation capacitor CA. The third control transistor Q3 can transmit the compensation voltage stored in the compensation capacitor CA to the second inverting terminal (–) of the error amplifier ERA, corresponding to the inverted and delayed vertical synchronization signal IDVSYNC output from the delay DEL. The third control transistor Q3 can be turned off, in response to an inverted and delayed vertical synchronization signal IDVSYNC of logic low (L), during the first operation period P1 and the second operation period P2, and can be turned on, in response to an inverted and delayed vertical synchronization signal IDVSYNC of logic high (H), during the third operation period P3.

The compensation capacitor CA can include the one end connected to the second electrode of the second control transistor Q2 and the second electrode of the third control transistor Q3, and the other end connected to a ground line. The compensation capacitor CA can store a high-level voltage FEVDD fed back through the feedback terminal of the power supply 180.

The first resistor R1 can include one end connected to a first power line of a display panel 150, and the other end connected to the feedback terminal of the power supply 180. The second resistor R2 can include one end connected to the other end of the first resistor R1 and the feedback terminal of the power supply 180, and the other end connected to the ground line. The first resistor R1 and the second resistor R2 (e.g., voltage divider) can divide the high-level voltage EVDD supplied through the first power line and, as such, can supply the resultant voltage to the feedback terminal of the power supply 180, as a fed-back high-level voltage FEVDD. Although the first resistor R1 and the second resistor R2 are shown as being disposed outside the power supply 180, the first resistor R1 and the second resistor R2 can be internally included in the power supply 180.

Figure 11:
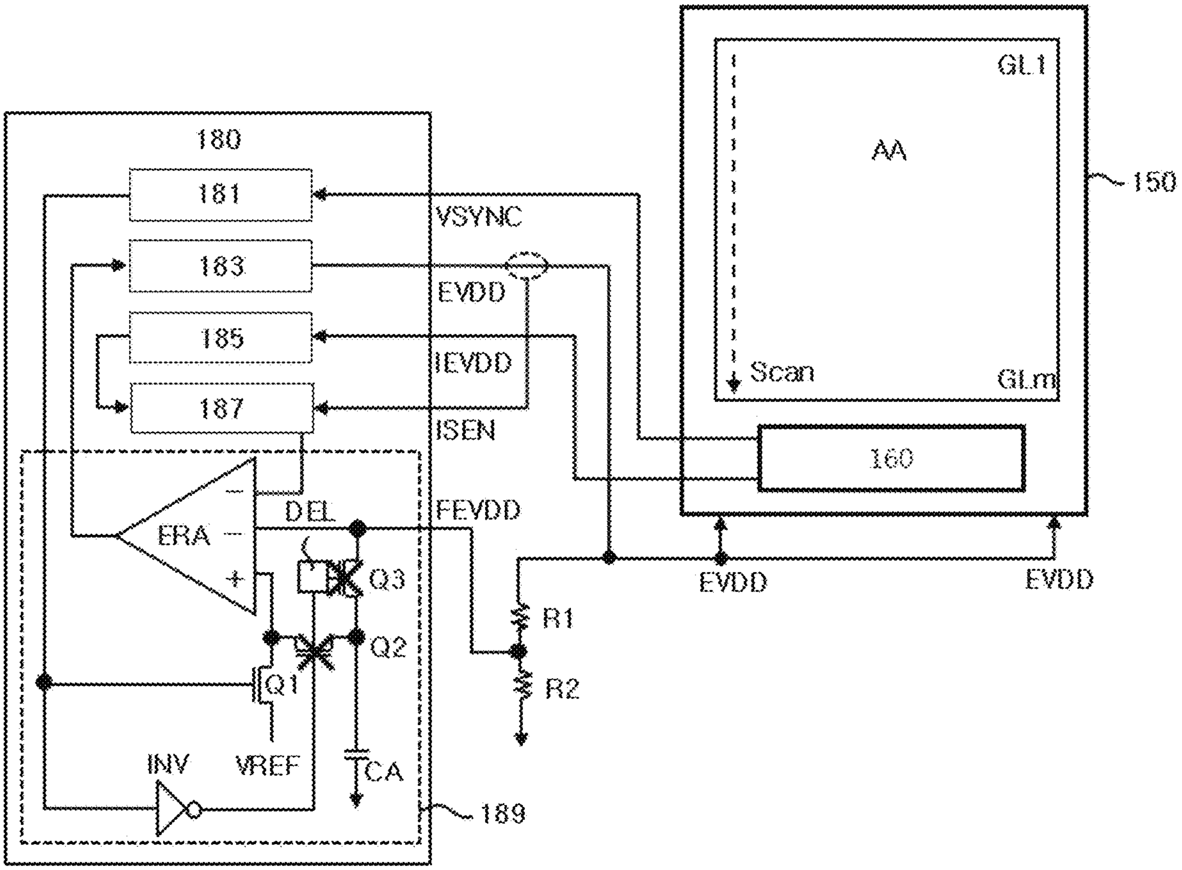
FIGS. 11 to 13 are diagrams explaining the first operation period of the power supply according to an embodiment of the present disclosure.
Figure 12:
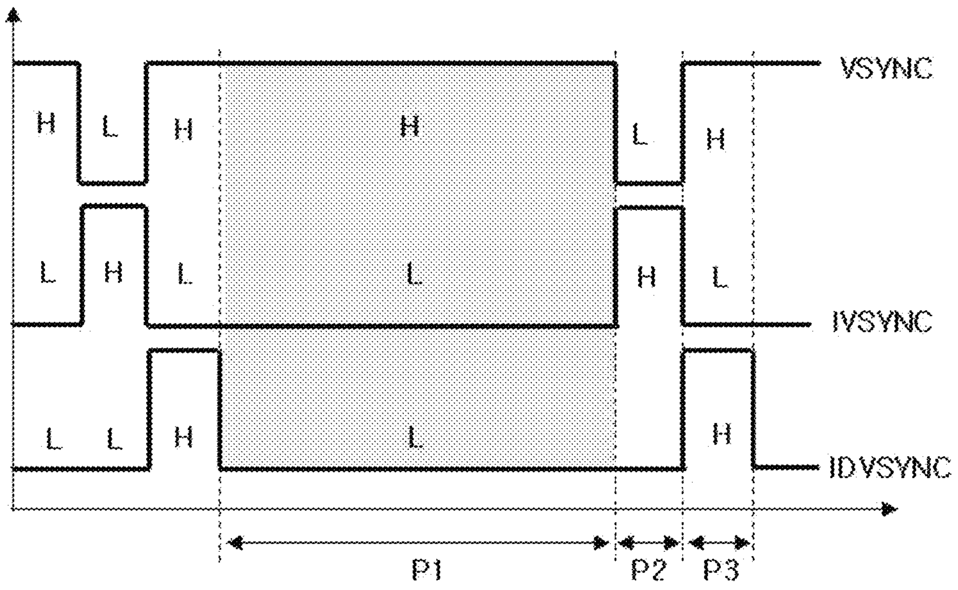
Figure 13:
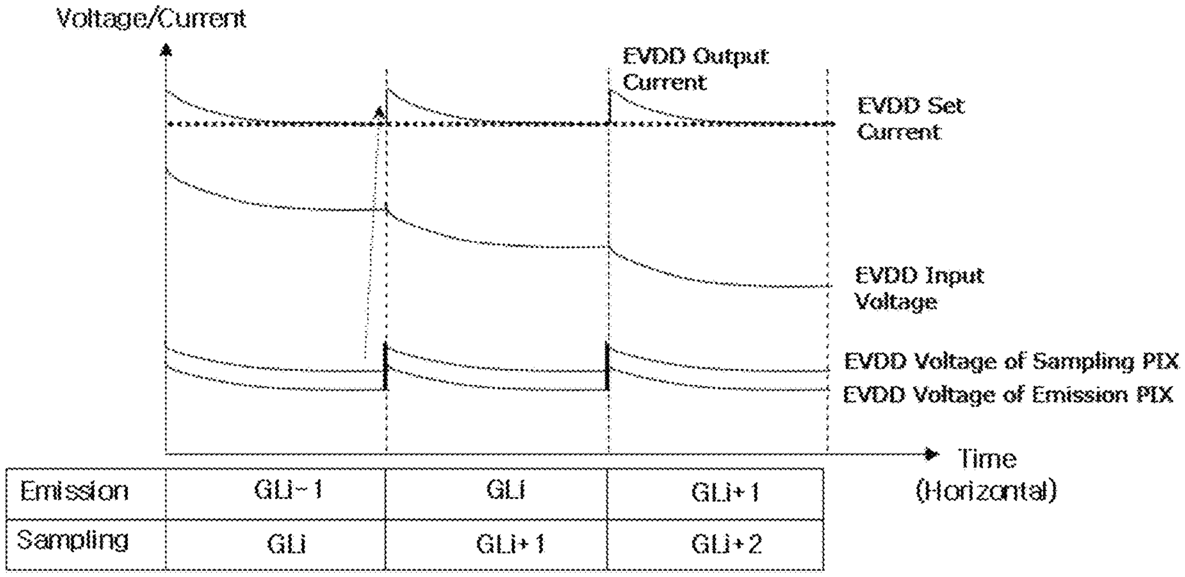
Figure 14:
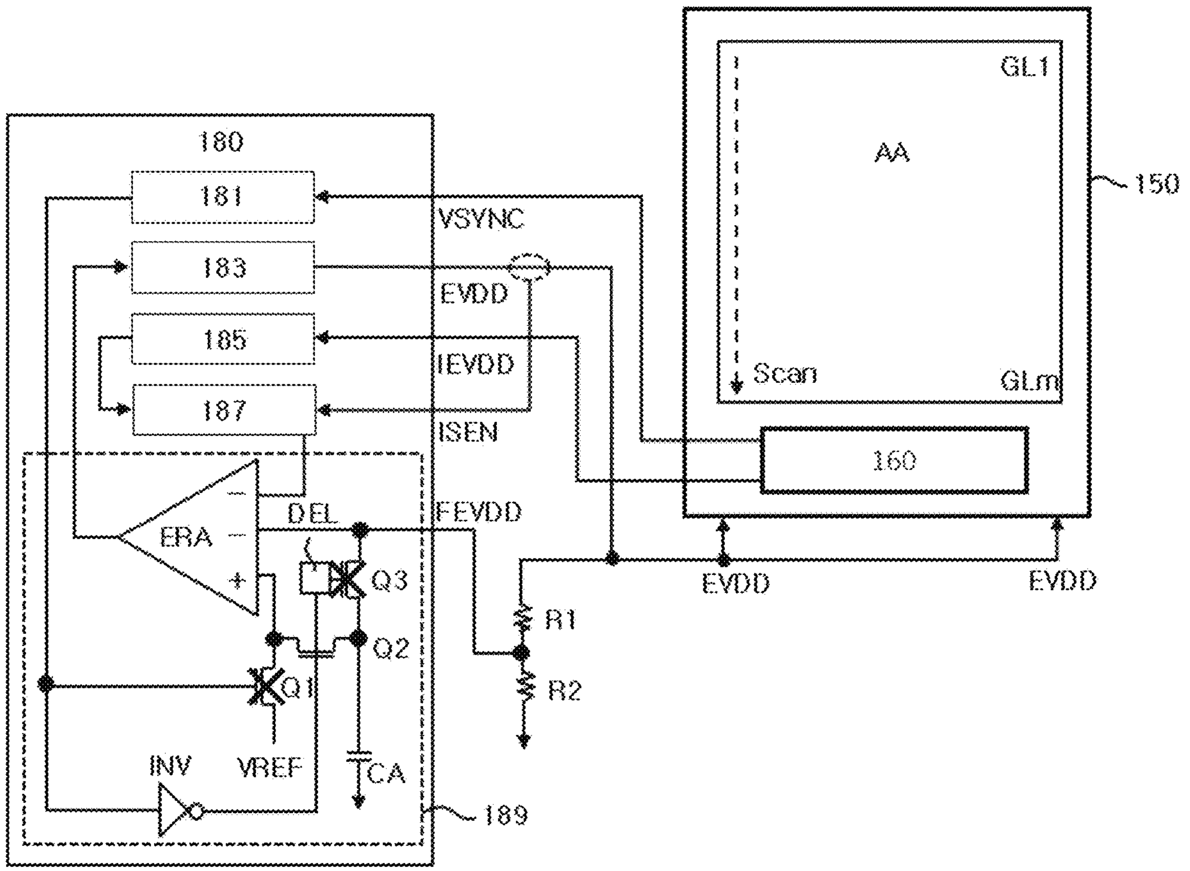
FIGS. 14 to 16 are diagrams explaining the second operation period of the power supply according to an embodiment of the present disclosure.
Figure 15:
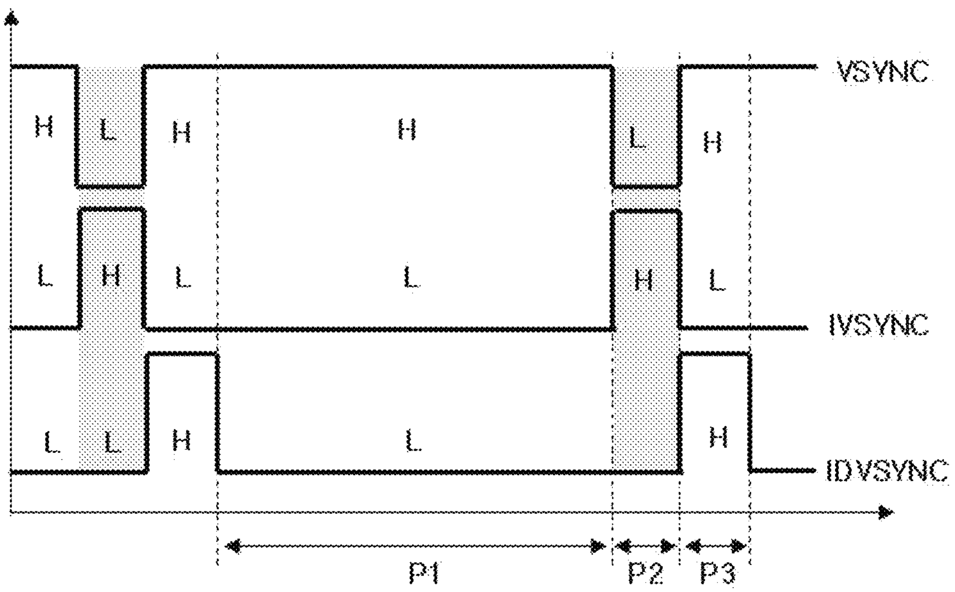
Figure 16:
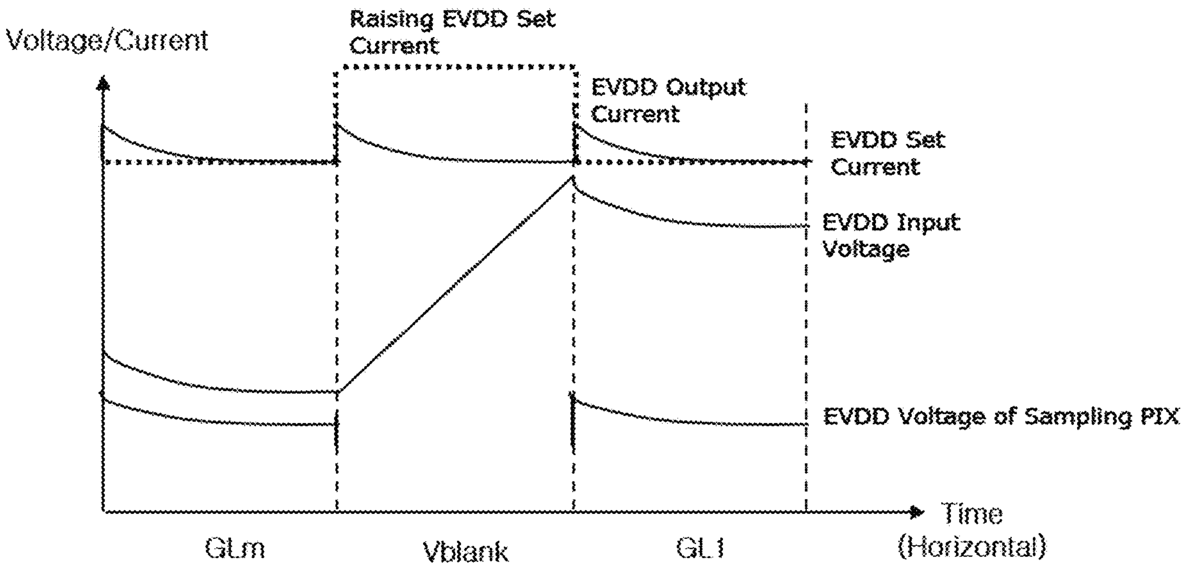
Figure 17:
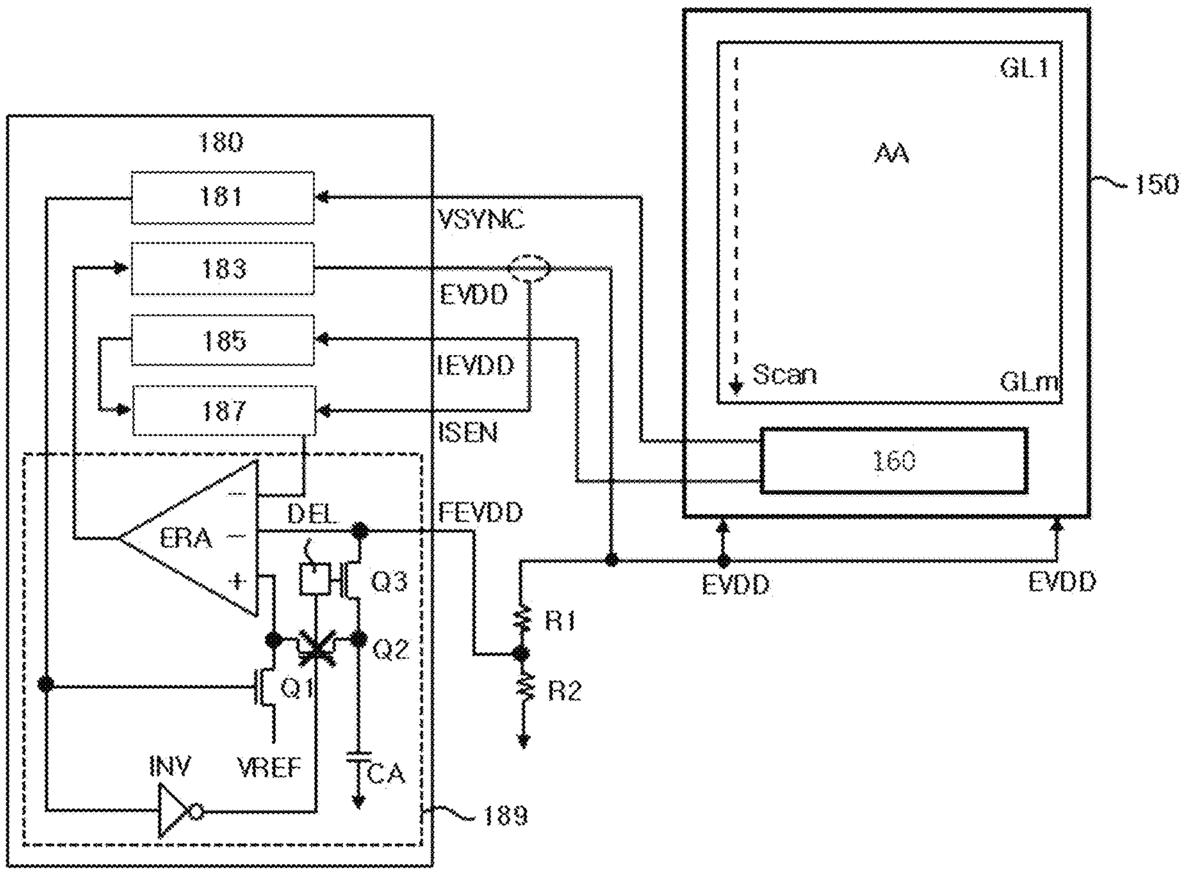
FIGS. 17 to 19 are diagrams explaining the third operation period of the power supply according to an embodiment of the present disclosure.
Figure 18:
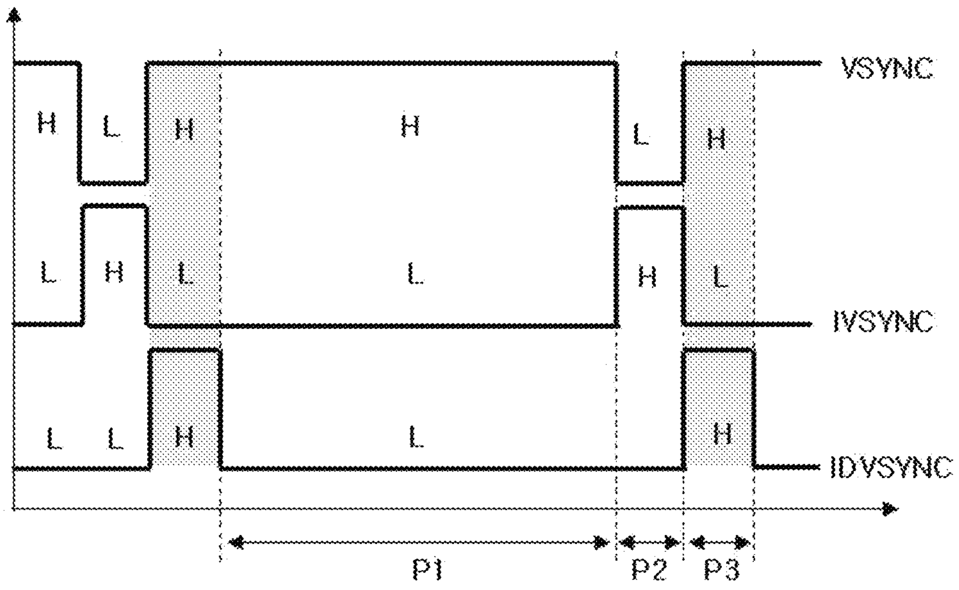
Figure 19:
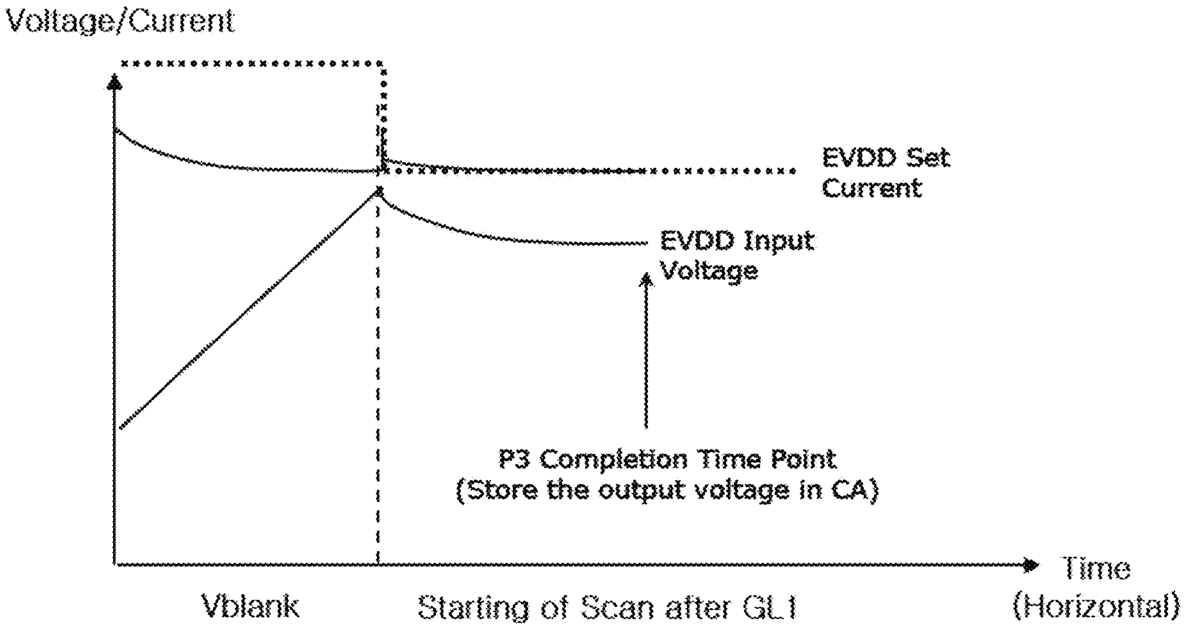

FIGS. 11 to 13 are diagrams explaining the first operation period of the power supply. FIGS. 14 to 16 are diagrams explaining the second operation period of the power supply. FIGS. 17 to 19 are diagrams explaining the third operation period of the power supply.

As shown in FIGS. 11 to 13, the first control transistor Q1 can be in a state of being turned on by the vertical synchronization signal VSYNC of logic high (H) during the first operation period P1 of the power supply 180. On the other hand, during the first operation period P1 of the power supply 180, the second control transistor Q2 can be in a state of being turned off by the inverted vertical synchronization signal IVSYNC of logic low (L), and the third control transistor Q3 can be in a state of being turned off by the inverted and delayed vertical synchronization signal IDVSYNC of logic low (L).

The first operation period P1 of the power supply 180 can be a constant current driving period (second constant current driving period) after execution of a scan operation of the display panel 150, and can be a period after application of the vertical synchronization signal VSYNC. After application of the vertical synchronization signal VSYNC, the display panel 150 can perform a scan operation Scan from an upper end area thereof to a lower end area thereof. That is, the display panel 150 can be in a driving state after application of the vertical synchronization signal VSYNC.

The voltage output unit 183 can raise or drop the high-level voltage EVDD in accordance with output current ISEN (or actual current) of the high-level voltage EVDD and set current. For example, in the situation of set current>actual current, the high-level voltage EVDD can be raised, whereas, in the situation of set current<actual current, the high-level voltage EVDD can be dropped. In this situation, the high-level voltage EVDD can be output such that the high-level voltage EVDD has a highest level in the upper end area of the display panel 150, and has a level that is gradually lowered as the display panel 150 extends toward the lower end area thereof. This can be seen by referring to output of an input voltage of a high level (an EVDD input voltage) in a gradually lowered state. In other words, the voltage output unit 183 can dynamically and gradually adjust the high-level voltage EVDD for different areas of the display panel so that the actual measured current coming from the display panel can be compensated to best match the set current that is set by the power supply 180. For example, the power supply 180 can finely tune and continuously adjust the high-level voltage EVDD as each line of subpixels is scanned, thus providing for much more uniform image quality.

As the high-level voltage EVDD output from the power supply 180 is controlled as described above, pixels of the display panel 150, at which sampling is begun, can perform a sampling operation based on substantially the same high-level voltage (an EVDD voltage of a sampling pixel (sampling PIX)). In addition, pixels of the display panel 150, at which light emission is begun, can also perform an emission operation based on substantially the same high-level voltage (an EVDD voltage of an emission pixel (Emission PIX)).

In this situation, the output current of the high-level voltage output from the power supply 180 (EVDD current) can be maintained at a level approximate to that of the set current (EVDD set current). Of course, there is a difference substantially corresponding to one gate line (one scan line) between the period in which the emission operation of the pixel is performed and the period in which the sampling operation of the pixel is performed. This can be seen from a difference between an emission operation of a pixel connected to a previous-stage gate line (for example, GLi–1) and a sampling operation of a pixel connected to a current-stage gate line (for example, GLi), which is performed during the emission operation of the pixel connected to the previous-stage gate line.

For this reason, the output current of the high-level voltage output from the power supply 180 (EVVD current) can exhibit a slightly increasing tendency between gate lines. That is, the output current of the high-level voltage (EVDD current) applied to the current-stage gate line (for example, GLi) can be initially slightly increased, corresponding to a sampling operation of a next-stage gate line (for example, GLi+1).

However, the pixels connected to respective gate lines can perform sampling operations and emission operations, based on high-level voltages having substantially the same level, and temporal current increments, which are generated at approximate or equal levels, can be removed after being averaged. Accordingly, conditions enabling uniform image expression can be established.

As shown in FIGS. 14 to 16, during the second operation period P2 of the power supply 180, the first control transistor Q1 can be in a state of being turned off by a vertical synchronization signal VSYNC of logic low L, and the third control transistor Q3 can be in a state of being turned off by an inverted and delayed vertical synchronization signal IDVSYNC of logic low L. On the other hand, the second control transistor Q2 can be in a state of being turned on by an inverted vertical synchronization signal IVSYNC of logic high H.

The second operation period P2 of the power supply 180 is a period for constant-voltage driving, and can be a period after entrance of a vertical blank period Vblank. After entering the vertical blank period Vblank, the display panel 150 can be in a non-driving state in which the display panel 150 does not perform a scan operation Scan. In other words, entrance of the vertical blank period Vblank means that the scan operation Scan up to an M-th gate line GLm has been completed, and a preparation time for the start of a scan operation Scan from the first gate line GL1 can then be provided. For example, after the last line of subpixels (e.g., GLm) in the display panel has been scanned, the power supply 180 can rapidly increase the high-level voltage EVDD during the vertical blank period Vblank, effectively using the vertical blank period Vblank as a type of reset period for the power supply 180.

After entrance of the vertical blank period Vblank, the high-level voltage EVDD can be in a greatly-lowered state. The output current setting unit 185 can set an output current amount to be higher than a maximum output current amount required by the display panel 150, in order to rapidly compensate the lowered high-level voltage EVDD. To this end, the error amplifier ERA can receive a set current value set to be high, through the first inverting terminal (−) thereof. For example, the power supply can quickly reset the high-level voltage EVDD during the vertical blank period Vblank to get ready for the next display period.

After entrance of the vertical blank period Vblank, the second control transistor Q2 can be turned on, and a compensation voltage charged in the compensation capacitor CA can be supplied to the non-inverting terminal (+) of the error amplifier ERA by the turned-on second control transistor Q2. The error amplifier ERA can output a voltage control signal, based on two values supplied to the first non-inverting terminal (−) thereof and the non-inverting terminal (+) thereof.

The voltage output unit 183 can rapidly raise the high-level voltage EVDD output from the power supply 180, based on the voltage control signal output from the error amplifier ERA. In this situation, the voltage output unit 183 can raise the high-level voltage EVDD up to the level of the compensation voltage charged in the compensation capacitor CA. In this situation, the level of the compensation voltage can be varied in accordance with resistance values of the first resistor R1 and the second resistor R2.

As such, it can be possible to prevent a problem that a sampling operation or an emission operation is performed based on a low high-level voltage during a scan operation Scan of the display panel 150, by rapidly raising a high-level voltage EVDD output from the power supply 180 after entrance of the vertical blank period Vblank. For example, as shown in the FIG. 16, the high-level voltage EVDD can rapidly rise in a linear fashion during the vertical blank period Vblank, but is not limited thereto.

As shown in FIGS. 17 to 19, during the third operation period P3 of the power supply 180, the first control transistor Q1 can be in a state of being turned on by a vertical synchronization signal VSYNC of logic high H, and the third control transistor Q3 can be in a state of being turned on by an inverted and delayed vertical synchronization signal IDVSYNC of logic high H. On the other hand, the second control transistor Q2 can be in a state of being turned off by a vertical synchronization signal IVSYNC of logic low L.

The third operation period P3 of the power supply 180 is a period for constant-current driving (a first constant-current driving period) in synchronization with a scan operation of the display panel 150, and can be a point in time when a vertical synchronization signal VSYNC is applied after entrance of a vertical blank period Vblank. Since the third operation period P3 is the point in time when the vertical synchronization signal VSYNC is applied after entrance of the vertical blank period Vblank, the display panel 150 can be in a driving state in which the display panel 150 performs a scan operation Scan from the first gate line GL1.

At the point in time when the vertical synchronization signal VSYNC is applied, the power supply 180 can set an output current amount corresponding to an output current amount required by the display panel 150, based on current amount information IEVDD supplied from the driver 160.

The output current sensing unit 187 can sense output current flowing through the first power line, and can transmit the sensed results to the current/voltage control unit 189. The current/voltage control unit 189 can store, in the compensation capacitor CA, a high-level voltage EVDD at a point in time when output current of a high-level voltage (actual current) becomes approximate or equal to set current of a high-level voltage (e.g., since the first gate line GL1 experiences little to no IR drop). To this end, a delay value of the delay DEL, which generates the inverted and delayed vertical synchronization signal IDVSYNC, can be set to a time satisfying "the set current of the high-level voltage=the output current of the high-level voltage (actual current)."

A high-level voltage EVDD divided by the first resistor R1 and the second resistor R2 can be stored in the compensation capacitor CA by an operation of the third control transistor Q3. The compensation voltage stored in the compensation capacitor CA is a voltage for application of a correct high-level voltage EVDD to the upper end area of the display panel 150 and, as such, can correspond to a voltage enhancing accuracy in a sampling operation of the pixels (e.g., an EVDD voltage level for a correct sampling operation). The compensation voltage stored in the compensation capacitor CA can be referred to as a "reference value" that can be referred to in order to rapidly raise the high-level voltage EVDD in the first operation period P1 of the power supply 180. After completion of the first constant-current driving period, which is the third operation period P3 of the power supply 180, a second constant-current driving period, which is the first operation period P1, can follow.

Figure 20:
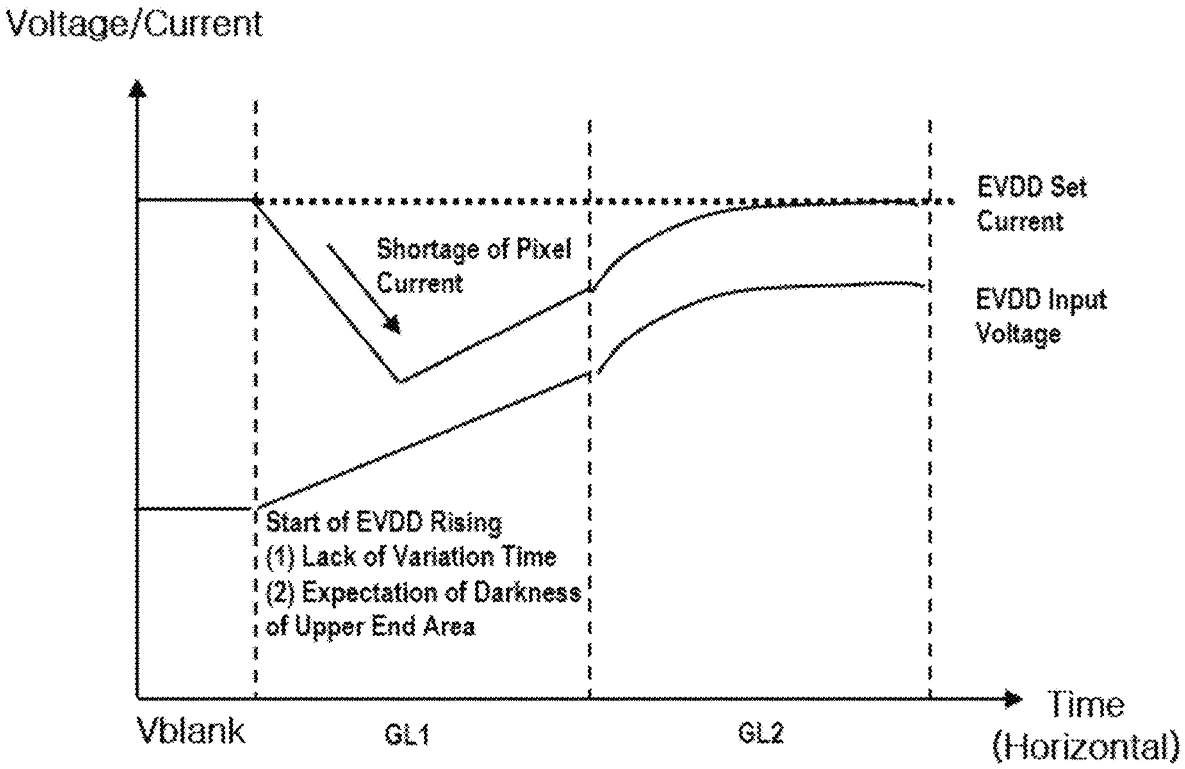
FIG. 20 is a diagram explaining a power supply according to a comparative example.

FIG. 20 is a diagram explaining a power supply according to a comparative example.

As shown in FIG. 20, the power supply according to the comparative example does not include a configuration for varying a high-level voltage EVDD, corresponding to a driving period of a display panel and, as such, rising of the high-level voltage EVDD can be begun from a point in time when a scan operation for the first gate line GL1 is begun. In this situation, the upper end area of the display panel may end up be darker than other areas, due to a lack of time for when a voltage variation for rising of the high-level voltage EVDD is performed. In addition, the pixels connected to the gate lines of the upper end area of the display panel (for example, GL1 and GL2) can suffer a current amount shortage phenomenon (the charge amount of the capacitor is also insufficient because the EVDD input voltage and current are low).

In contrast to the comparative example shown in FIG. 20, a power supply according to an embodiment of the present disclosure can perform constant-voltage driving before a scan operation of a display panel, in order to rapidly raise a high-level voltage in time before the next driving period, and can then perform constant-current driving in order to achieve stable current supply, together with scan driving of the display panel. As a result, the power supply according to the embodiment of the present disclosure can eliminate influence of IR drop, but it can also stably supply current for driving of the display panel, even at the start of a subsequent display period.

As apparent from the above description, in accordance with the example embodiments of the present disclosure, there are effects of not only eliminating influence of IR drop, but also stably supplying current for driving of a display panel, based on a power supply capable of performing constant voltage driving and constant current driving, corresponding to a driving period of the display panel, thereby maintaining a uniform display quality throughout a screen, even for display panels that have very large sizes. In addition, in accordance with the example embodiments of the present disclosure, there is an effect of providing a power supply capable of adaptively controlling a voltage and current, corresponding to a driving period of the display panel.

The foregoing description and the accompanying drawings have been presented in order to illustratively explain technical ideas of the present disclosure. A person skilled in the art to which the present disclosure pertains can appreciate that diverse modifications and variations acquired by combining, dividing, substituting, or changing constituent elements can be possible without changing essential characteristics of the present disclosure. Therefore, the foregoing embodiments disclosed herein shall be interpreted as illustrative only and not as limitative of the principle and scope of the present disclosure. It should be understood that the scope of the present disclosure shall be defined by the appended claims and all equivalents thereto fall within the scope of the present disclosure.

What is claimed is:

1. A light emitting display device comprising:

a display panel configured to display an image;

a driver configured to drive the display panel; and a power supply configured to supply a high-level voltage to a first power line of the display panel, wherein the power supply comprises a voltage controller configured to:

receive, from the driver, a vertical synchronization signal and current amount information of the high-level voltage for driving of the display panel, and boost the high-level voltage to be supplied to the display panel during a vertical blank period, based on the vertical synchronization signal and the current amount information of the high-level voltage, wherein the power supply is configured to store a fed-back voltage in a compensation capacitor included in the power supply to use the fed-back voltage as a reference value for boosting of the high-level voltage to be supplied to the display panel, and wherein the voltage controller comprises:

an error amplifier configured to output a voltage control signal for adjusting the high-level voltage;

an output current sensing circuit configured to supply sensing results of sensed current from the first power line to a first inverting terminal of the error amplifier;

a first control transistor configured to supply a reference voltage to a non-inverting terminal of the error amplifier, in response to the vertical synchronization signal;

a second control transistor configured to supply a compensation voltage stored in the compensation capacitor to a second inverting terminal of the error amplifier, in response to an inverted vertical synchronization signal generated through inversion of the vertical synchronization signal; and a third control transistor configured to store a high-level voltage fed back from the first power line in the compensation capacitor, in response to an inverted and delayed vertical synchronization signal generated through delay of the inverted vertical synchronization signal.

2. The light emitting display device according to claim 1, wherein the power supply is configured to:

dynamically lower the high-level voltage for driving of the display panel from a starting high-level voltage to an ending high-level voltage during one display period, the ending high level voltage being less than the starting high-level voltage, and boost the high-level voltage from the ending high-level voltage back to the starting high-level voltage during the vertical blank period and before a start of a next display period.

3. The light emitting display device according to claim 1, further comprising:

a plurality of gate lines connected to a plurality of subpixels in the display panel, wherein the power supply is configured to:

gradually lower the high-level voltage from when a first gate line among the plurality of gate lines is scanned until a last gate line among the plurality of gate lines is scanned during one display period.

4. The light emitting display device according to claim 3, wherein a last group of subpixels connected to the last gate line are in an area of the display panel that is located closer to the first power line than a first group of subpixels connected to the first gate line.

5. The light emitting display device according to claim 1, wherein the voltage controller is further configured to:

receive the fed-back voltage fed back from the first power line while sensing sensed current from the first power line, and set an output current of the high-level voltage based on the current amount information and the sensed current.

6. The light emitting display device according to claim 1, wherein the power supply is further configured to:

perform constant-current driving when the display panel is driven, and perform constant-voltage driving when the display panel is not driven.

7. The light emitting display device according to claim 6, wherein the power supply turns off the first and third control transistors and turns on the second control transistor, for boosting the high-level voltage to be supplied to the display panel, during a period in which the constant-voltage driving is performed.

8. The light emitting display device according to claim 6, wherein the power supply comprises a first constant-current driving period during which the power supply turns on the first and third control transistors and turns off the second control transistor, for storing the high-level voltage fed back from the first power line in the compensation capacitor, during a period in which the constant-current driving is performed.

9. The light emitting display device according to claim 8, wherein the power supply comprises a second constant-current driving period during which the power supply turns off the second and third control transistors and turns on the first control transistor after completion of the first constant-current driving period, for setting current for another constant-current driving period.

10. A power supply comprising:

a vertical synchronization signal input circuit configured to receive a vertical synchronization signal from an external device;

a voltage controller configured to:

receive current amount information of a high-level voltage from the external device, and output a voltage control signal during a vertical blank period, based on the vertical synchronization signal and the current amount information of the high-level voltage;

a voltage output circuit configured to vary the high-level voltage during the vertical blank period, based on the voltage control signal, and to output the varied high-level voltage, wherein the power supply is configured to store a fed-back voltage in a compensation capacitor included in the power supply to use the fed-back voltage as a reference value for boosting of the high-level voltage to be supplied to the display panel, and wherein the voltage controller comprises:

an error amplifier configured to output a voltage control signal for adjusting the high-level voltage;

an output current sensing circuit configured to supply current sensing results output from the voltage output circuit to a first inverting terminal of the error amplifier;

a first control transistor configured to supply a reference voltage to a non-inverting terminal of the error amplifier, in response to the vertical synchronization signal;

a second control transistor configured to supply a compensation voltage stored in the compensation capacitor to a second inverting terminal of the error amplifier, in response to an inverted vertical synchronization signal generated through inversion of the vertical synchronization signal; and a third control transistor configured to store an externally fed-back high-level voltage in the compensation capacitor, in response to an inverted and delayed vertical synchronization signal generated through delay of the inverted vertical synchronization signal.

11. The power supply according to claim 10, wherein the voltage output circuit varies the high-level voltage during the vertical blank period while maintaining a constant current to provide a constant-current driving period.

12. The power supply according to claim 10, wherein the high-level voltage is boosted when the first and third control transistors are turned off, and the second control transistor is turned on.

13. The power supply according to claim 10, wherein the compensation capacitor stores the externally fed-back high-level voltage when the first and third control transistors are turned on, and the second control transistor is turned off.

14. The power supply according to claim 10, wherein the power supply is configured to:

dynamically lower the high-level voltage for driving of a display panel from a starting high-level voltage to an ending high-level voltage during one display period, the ending high level voltage being less than the starting high-level voltage, and boost the high-level voltage from the ending high-level voltage back to the starting high-level voltage during the vertical blank period and before a start of a next display period.

* * * * *